Feb. 18, 1958 W. C. REDMAN ET AL 2,824,252
IONIZATION CHAMBER

Filed April 12, 1954 2 Sheets-Sheet 1

INVENTORS
William C. Redman
Francis R. Shonka
BY
*Roland A. Anderson*
ATTORNEY

Feb. 18, 1958 W. C. REDMAN ET AL 2,824,252
IONIZATION CHAMBER
Filed April 12, 1954 2 Sheets-Sheet 2
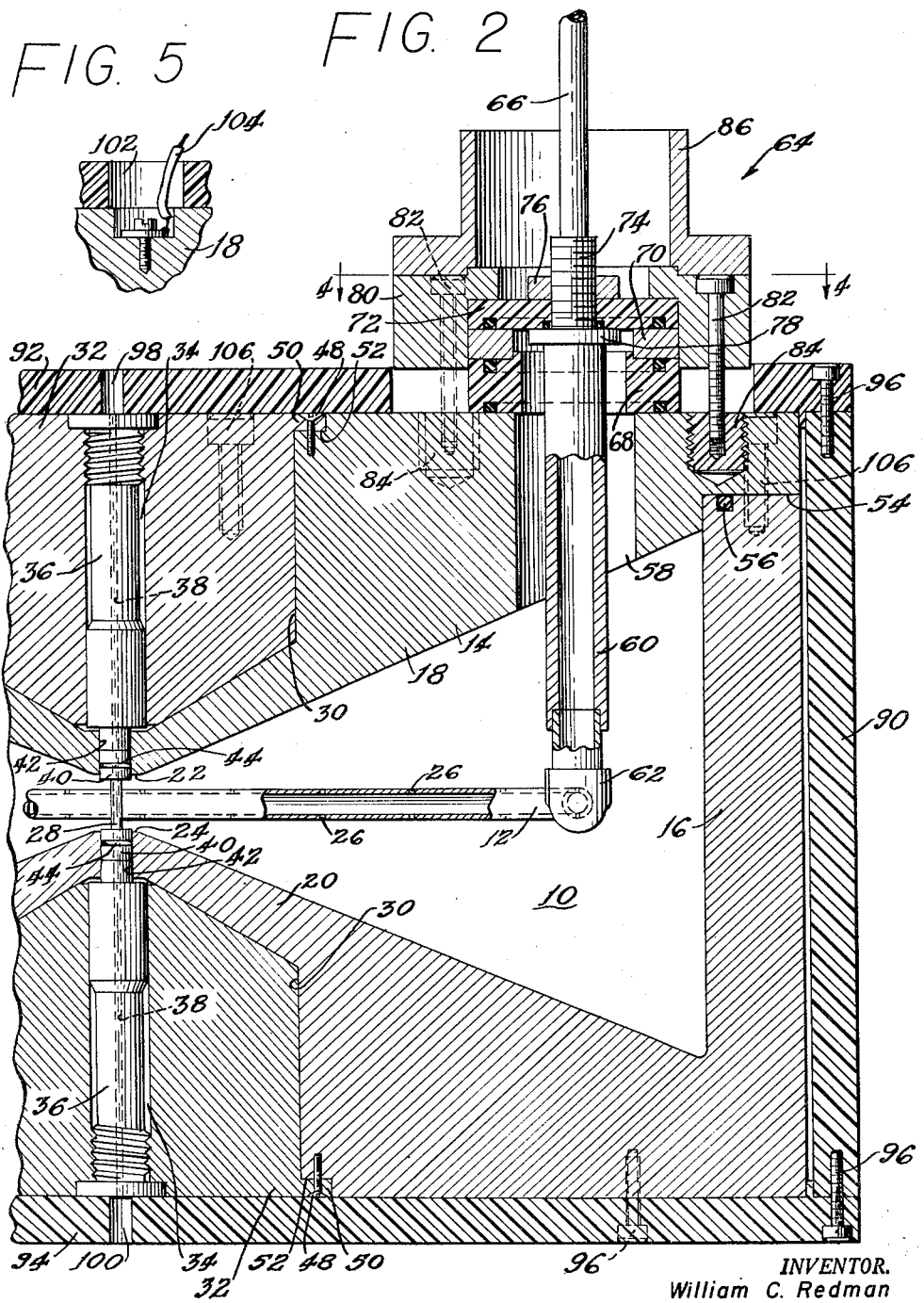
FIG. 5
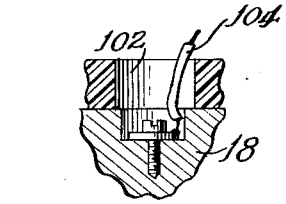
INVENTOR.
William C. Redman
Francis R. Shonka
BY
Roland A. Anderson
ATTORNEY United States Patent Office
2,824,252
Patented Feb. 18, 1958

2,824,252

IONIZATION CHAMBER

William C. Redman, Hinsdale, and Francis R. Shonka, Riverside, Ill., assignors to the United States of America as represented by the United States Atomic Energy Commission Application April 12, 1954, Serial No. 422,703

9 Claims. (Cl. 313—93)

This invention relates to an improvement in ionization chambers for the measurement of radioactivity, and more specifically to an ionization chamber for the measurement of the radioactivity of localized portions of elongated bodies, particularly wires.

It is frequently desirable to measure the radioactivity of small longitudinal portions of elongated bodies such as wires. One particularly useful application of this type of measurement lies in the plotting of neutron flux density patterns in neutronic reactors or "piles." Such measurements are made in a number of different manners. In the earliest methods of making such measurements (commonly called "neutron flux traverses"), foils of material adapted to be rendered radioactive by neutron flux were inserted in slots provided for this purpose in the reactor structures in which the measurements were to be made, the subsequent radioactivity of the irradiated foils being indicative of the flux existent in the portions of the reactor or pile in which the respective foils were placed. As the neutronic reactor art advanced, higher neutron fluxes were made the subject of measurement, and wires were frequently used in place of foils, having the advantage not only that very little, if any, provision for their introduction need be made in the design of the reactors upon which such measurements are to be made, but additionally being capable of making the measurement of neutron flux in a much more localized fashion, i. e., of measuring flux density changes occurring within much smaller distances. The wires, like the previous foils, are either of materials which are rendered radioactive by neutron bombardment without fission, or of fissionable materials such as $U^{235}$, which are fissioned by the neutrons, the resultant fission products providing the radio activity which indicates the neutron flux to which the material has been subjected. In one type of measurement, the wires are inserted at various points in the reactor in short lengths. In another type of measurement, a long wire is used, covering the entire length of the region over which the neutron flux traverse is to be made, and the various portions of the wire are thereafter separately counted. In general, such counting has been preceded by cutting of the wire into appropriate lengths.

It has been determined that a more satisfactory method of measurement of neutron flux patterns employs the continuous measurement of the radioactivity of such an elongated wire by passing the wire through or adjacent to a suitable ionization chamber after irradiation, a recording of the ionization chamber current as the wire is moved at uniform speed thus constituting a plot of the neutron flux variations. A desirable material for use in this type of measurement has been found to be a wire containing 14% manganese, 2% molybdenum, and 84% iron. Such material is commercially available, being frequently used in welding rods, and is readily fabricated in the form of a thin rod or wire $\frac{1}{32}$ of an inch in diameter, which is suitable for use in the making of neutron flux measurements of the type described above. The only radioactivity which is substantial when this material is exposed to neutrons is that of the manganese; since the radioactivity induced in the manganese is of fairly short half-life, wires using this material may be reused frequently without necessitating corrections for previous exposures.

The present invention provides a novel ionization chamber which is well-suited to measuring the radio-activity of the various portions of a wire as the wire is moved at uniform speed, in order to produce a neutron flux traverse pattern of a neutronic reactor, as set forth above. In providing such an ionization chamber, there is also provided a structure which is well adapted to the measurement of localized longitudinal portions of any elongated body.

By the structure of the present invention, the current through the ionization chamber is made responsive to the radiations from only a very small longitudinal portion of the wire or other elongated body with which the ionization chamber is employed. Additionally, the present structure maximizes the sensitivity and discrimination of the ionization chamber in making such measurements by maximizing the ionization produced by each particle emitted from the portion of the wire instantaneously under measurement, and yet minimizing the response of the chamber to portions of the wire other than the portion which is instantaneously under measurement. The structural features by which these advantages are obtained will best be understood from a description of a particular embodiment of the various aspects of the invention which has been selected for illustration in the appended drawing, and described below, in accordance with the patent laws.

In the drawing:

Fig. 2 is a vertical sectional view taken along the line 2—2 of Fig. 1;

Fig. 5 is a fragmentary sectional view taken along the line 5—5 of Fig. 1.

Figure 1:
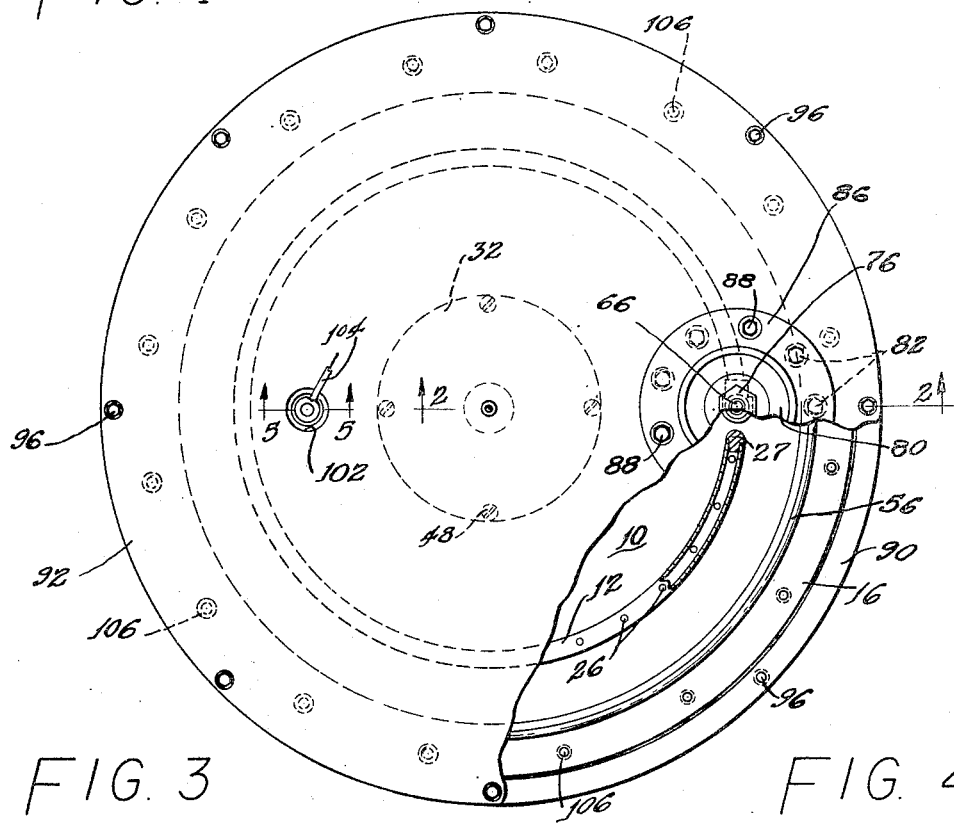
Fig. 1 is a plan view, partially broken away in section, of an ionization chamber which incorporates the various features of novelty by which the above advantages are obtained.

The ionization chamber illustrated is of the usual type comprising an ionization cavity 10 and electrodes generally designated 12 and 14 arranged to conduct ionization currents through the cavity 10, the amount of such conduction being proportional to the ionization occurring in the cavity and thus proportional to the radioactivity under measurement. In the present embodiment, the outer electrode 14 forms the enclosure of the ionization cavity 10 and consists generally of a cylindrical side wall 16 and conical end walls 18 and 20, the latter having spaced apices 22 and 24. The main body of the inner electrode 12 is a hollow tube which is uniformly perforated at 26 and is bent to substantially the form of a circle coaxial with the side wall 16, the end being sealed by a plug 27. Extending into the end walls 18 and 20 and connecting the apices 22 and 24 is a conduit 28 having a thin-walled section within the cavity 10.

It will thus be seen that the ionization cavity 10 is essentially in the form generated by the revolution of an isosceles trapezoid about the smaller of its parallel sides. It will readily be seen that this configuration minimizes the length of the conduit 28 which connects the apices 22 and 24 of the end walls, while at the same time maximizing the efficiency of the chamber in responding to radiations emanating from within the conduit 28 by providing a large solid angle in which the cavity is exposed to the radiations.

Figure 3:
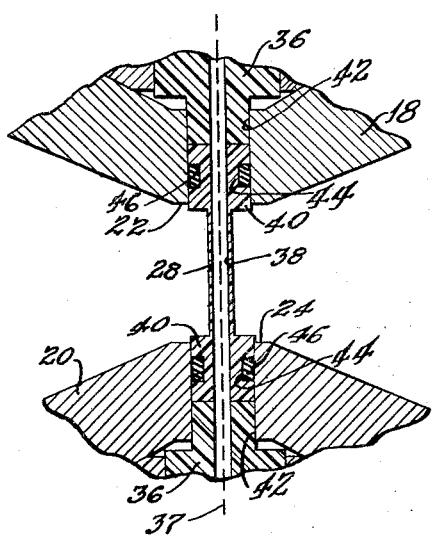
Fig. 3 is an enlarged fragmentary sectional view corresponding to a portion of Fig. 2, and showing a wire under measurement in dotted fashion.
Figure 4:
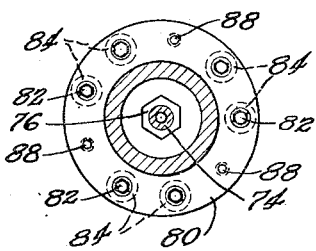
Fig. 4 is a fragmentary top plan view illustrating a portion of the device of Fig. 1, as indicated by the arrows 4—4 in Figure 2.

The end walls 18 and 20 are formed predominantly of a suitable conducting material such as aluminum. The side wall 16 is formed integrally with the lower end wall 20 for simplicity of construction. Extending inwardly from the outer surfaces of the conical end walls 18 and 20 in the central region thereof are cup-shaped recesses 30 into which are fitted shield plugs 32 of lead or similar radiation absorbing material (material having a specific gravity of at least 5.0), the inner ends of the recesses 30 and the plugs 32 being substantially conical. Each of the plugs 32 has an axial bore 34, threaded near the outer end. Secured in the bores 34 by corresponding threading are bushings 36 of methyl methacrylate having axial apertures 38 therethrough. A wire or other elongated body (indicated in Fig. 3 by a dotted line 37) can thus be passed through the conduit 28, which is made of an insulating material, and the bushings 36 from one end to the other of the structure in order to measure the radioactivity of successive longitudinal portions thereof. The ends of the conduit 28 have enlarged portions 40 seated in apertures 42 in the apices of the conical walls 18 and 20 and in endwise alignment with the bushings 36. Each enlarged portion 40 of the conduit 28 has a circumferential groove 44 in which is seated an O-ring 46, the O-rings 46 being compressed in the apertures 42 to form gas-tight seals.

The plugs 32 are secured in place in the end walls 18 and 20 by screws 48 fastening flanges 50 formed on the plugs 32 to the walls 18 and 20, the latter being shouldered at 52 to accept the flanges 50.

As stated above, the side wall 16 is formed integrally with the lower end wall 20, the periphery of the upper end wall 18 being rabbeted at 54 to rest securely on the upper end of the side wall 16; an O-ring 56 is provided at this interface to form a gas-tight seal. The upper end wall 18 is apertured at 58 to pass a conducting support tube 60 which is secured by a coupling 62 to the perforated copper tube which constitutes the inner portion of the electrode 12.

The upper end of the tube 60 passes through an insulating seal assembly generally designated by the numeral 64, a copper tube 66 being secured to the outer end of the tube 60.

The insulating seal 64 is constructed in the following manner: An annular insulating ring 68 rests on the outer surface of the end wall 18, being coaxial with the aperture 58. A brass ring 70 rests on the insulating ring 68 and an apertured insulating disk 72 in turn rests on the ring 70. The tube 60 has a threaded portion 74 extending through the aperture in the insulating disk 72, and a nut 76 clamps the disk 72 between the nut 76 and a flange 78 formed on the tube 60. This assembly is secured and held in place by a clamping ring 80 secured by bolts 82 to insulating inserts 84 threaded into the end wall 18. The insulating seal assembly is made gas-tight by appropriately placed O-rings which are compressed by the clamping ring 80. An annular cap 86 rests on the clamping ring 80 and is secured thereto by screws or bolts 88.

An insulating shell surrounds the main body of the ionization chamber to permit operation thereof with neither of the electrodes grounded to any structure upon which the ionization chamber is placed. This shell is formed by a tubular side wall 90 and end plates 92 and 94, secured to the side wall 90 by bolts 96. The end plates 92 and 94 are apertured at 98 and 100, these apertures being in register with the passage for the wire or other elongated body as discussed above. The upper end plate 92 is also apertured at 102 to permit an electrical connection 104 to the outer electrode, i. e., to the end wall 18. The latter is secured in place on the upper edge of the side wall 16 by bolts 106.

From the construction as thus described, the operation and advantage of the chamber will be obvious to those skilled in the art. The provision of the oppositely disposed convex walls with an aperture extending through each wall at the point of closest mutual spacing makes each successive portion of a wire or other elongated body passing through the aperture almost a point source, the flaring of the cavity surrounding the central portion increasing the solid angle "seen" by the portion of the wire between the end walls, thus contributing substantially to the efficiency of the chamber. The encirclement of the conduit 28 through which the wire is passed by the circular portion of the electrode 12 likewise contributes to the efficiency and also substantially eliminates difficulties which might otherwise arise due to possible circumferential inhomogeneities in the elongated body under measurement. The provision of the shield plugs as portions of the end walls through which the wire or other elongated body is passed minimizes the length of the wire whose radioactivity contributes substantially to the ionization occurring in the chamber. The construction of the inner electrode wherein it comprises a hollow electrically conducting tube extending through a wall of the ionization cavity and having openings in the portion thereof inside the cavity to connect the interior of the electrode with the interior of the cavity, and a filling opening on the exterior of the cavity, permits the chamber to be evacuated and filled with gas through the electrode. By the uniform perforations of the embodiment shown, this filling may be made in essentially nonturbulent fashion.

Persons skilled in the art will of course utilize the teachings of the invention in ionization chambers which, although possibly quite different in construction and exact mode of operation, nevertheless employ the inventive concepts herein disclosed. Accordingly, the scope of the patent protection afforded the invention shall not be deemed to be limited by the particular embodiment selected for illustration and description, but shall be determined only from the appended claims.

What is claimed is:

1. An ionization chamber for measuring the radioactivity of localized portions of elongated bodies, said chamber comprising electrodes and an ionization cavity, characterized by the construction wherein the chamber has as an outer electrode a cylindrical conducting side wall and conical conducting end walls having spaced apices and as an inner electrode a hollow electrically conducting tube extending into the cavity and having the inner end thereof uniformly perforated and bent to substantially the form of a circle coaxial with the outer electrode, and there is provided a thin-walled insulating conduit extending through both end walls and connecting the apices, at least a portion of each of said end walls surrounding the conduit being of radiation absorbing material to shield the cavity from radiations emanating from longitudinal portions of an elongated body within the conduit other than the longitudinal portion between the walls.

2. An ionization chamber for measuring the radioactivity of localized portions of elongated bodies, said chamber comprising electrodes and an ionization cavity, characterized by the construction wherein the chamber has an outer electrode, a cylindrical conducting side wall and convex conducting end walls and as an inner electrode a hollow electrically conducting tube extending into the cavity and having the inner portion thereof uniformly perforated and bent to substantially conform to the shape of the side wall, and there is provided a thin insulating conduit extending through both end walls at the point of closest mutual spacing, at least a portion of each of said end walls surrounding the conduit being of radiation absorbing material to shield the cavity from radiations emanating from longitudinal portions of an elongated body within the conduit other than the longitudinal portion between the walls.

3. An ionization chamber for measuring the radioactivity of localized portions of elongated bodies, said chamber comprising electrodes and an ionization cavity, characterized by the construction wherein the chamber has an outer electrode comprising oppositely disposed conducting end walls, a thin insulating conduit extending through both end walls at the point of closest mutual spacing, and an inner electrode surrounding the portion of the conduit within the cavity, at least a portion of each of said end walls surrounding the conduit being of radiation shielding material to isolate the cavity from radiations emanating from longitudinal portions of an elongated body within the conduit other than the longitudinal portion between the walls.

4. An ionization chamber for measuring the radioactivity of localized portions of elongated bodies, said chamber comprising electrodes and an ionization cavity, characterized by the construction wherein the chamber has a conducting outer electrode defining an ionizing region, a thin conduit extending through the ionizing region within the outer electrode, an inner electrode surrounding the portion of the conduit within the ionizing region, and bodies of radiation shielding material surrounding the extending ends of the conduit to isolate the cavity from radiations emanating from longitudinal portions of an elongated body within the conduit other than the longitudinal portion within the ionizing region.

5. An ionization chamber for measuring the radioactivity of localized portions of elongated bodies, said chamber comprising electrodes and an ionization cavity, characterized by the construction wherein the cavity has oppositely disposed convex walls and there is provided an aperture extending through each wall at the point of closest mutual spacing, at least a portion of each of said walls surrounding the aperture being of radiation shielding material to isolate the cavity from radiations emanating from longitudinal portions of an elongated body within the aperture other than the longitudinal portion between the walls.

6. An ionization chamber for measuring the radioactivity of localized portions of elongated bodies, said chamber comprising electrodes and an ionization cavity, characterized by the construction wherein the cavity has a cylindrical side wall and conical end walls having spaced apices and there is provided a thin conduit extending through both end walls and connecting the apices, at least a portion of each of said end walls surrounding the conduit being of radiation absorbing material to shield the cavity from radiations emanating from longitudinal portions of an elongated body within the conduit other than the longitudinal portion between the walls.

7. An ionization chamber for measuring the radioactivity of localized portions of elongated bodies, said chamber comprising electrodes and an ionization cavity, characterized by the construction wherein there is provided a thin conduit extending through opposite walls of the cavity, at least a portion of each of said walls surrounding the conduit being of radiation shielding material to isolate the cavity from radiations emanating from longitudinal portions of an elongated body within the conduit other than the longitudinal portion between the walls.

8. An ionization chamber for measuring the radioactivity of localized portions of elongated bodies, said chamber comprising electrodes and an ionization cavity, characterized by the construction wherein the cavity has oppositely disposed convex walls and there is provided an aperture extending through both walls at the point of closest mutual spacing.

9. An ionization chamber for measuring the radioactivity of localized portions of elongated bodies, said chamber comprising electrodes and an ionization cavity, characterized by the construction wherein the cavity has oppositely disposed conical walls having spaced apices and there is provided an aperture extending through each wall at the apex thereof, at least a portion of each of said walls surrounding the respective aperture being of radiation absorbing material to shield the cavity from radiations emanating from longitudinal portions of an elongated body within the conduit other than the longitudinal portion between the walls.

References Cited in the file of this patent

UNITED STATES PATENTS

| | | |
|---|---|---|
| 2,374,197 | Hare | Apr. 24, 1945 |
| 2,440,167 | Broxon et al. | Apr. 20, 1948 |
| 2,481,506 | Gamertsfelder | Sept. 13, 1949 |
| 2,641,710 | Pompeo et al. | June 9, 1953 |
| 2,735,944 | Greer | Feb. 21, 1956 |